United States Patent

[11] 3,612,139

| [72] | Inventors | Alfred Marzocchi<br>Cumberland;<br>Alfred Winsor Brown, Woonsocket, both of R.I. |
|---|---|---|
| [21] | Appl. No. | 849,669 |
| [22] | Filed | Aug. 13, 1969 |
| [45] | Patented | Oct. 12, 1971 |
| [73] | Assignee | Owens-Corning Fiberglas Corporation |

[54] NOVEL BEAD STRUCTURE FOR PNEUMATIC TIRES
5 Claims, 8 Drawing Figs.

[52] U.S. Cl. .................................................. 152/362
[51] Int. Cl. .................................................. B60c 15/04
[50] Field of Search .................................................. 152/362, 356

[56] References Cited
UNITED STATES PATENTS

| 1,606,885 | 11/1926 | Maynard | 152/362 |
| 1,943,272 | 1/1934 | Lerch | 152/362 |
| 2,224,274 | 12/1940 | Powers | 152/362 X |
| 2,952,293 | 9/1960 | Billingsley | 152/362 |
| 3,302,681 | 2/1967 | Travers | 152/362 |
| 3,315,722 | 4/1967 | Marzocchi et al. | 152/359 |
| 3,390,714 | 7/1968 | Marzocchi et al. | 152/356 |

FOREIGN PATENTS

| 767,378 | 1/1957 | Great Britain | 152/362 |
| 1,140,534 | 7/1957 | France | 152/362 |

*Primary Examiner*—Arthur L. La Point
*Assistant Examiner*—Robert Saifer
*Attorneys*—Staelin & Overman and Paul F. Stutz ABSTRACT: A pneumatic tire construction featuring a wheel-rim-engaging bead structure inclusive of a bead ring containing glass elements of particular form and in particular geometric disposition.

INVENTORS.
ALFRED MARZOCCHI
BY ALFRED WINSOR BROWN

ATTORNEYS

PATENTED OCT 12 1971 3,612,139

INVENTORS.
ALFRED MARZOCCHI
BY ALFRED WINSOR BROWN

ATTORNEYS

NOVEL BEAD STRUCTURE FOR PNEUMATIC TIRES

The present invention relates to novel bead structures for pneumatic tires.

The bead portion of a tire is a particularly critical component thereof by reason of its role as the primary connector, as it were, between the wheel of the vehicle and the ground-contacting tread. The bead is in direct abutting contact with the rim and, in a tubeless tire, is responsible for maintaining the air within the toroidal shell. Centrifugal force tending to throw the tire off the wheel is overcome by the bead. Additionally, of course, and perhaps more important, the forces of acceleration, with respect to the rear wheels, are transmitted to the tire via the abutting contact between the driven wheel rim and the bead. Similarly, in the case of braking or deceleration, the rapid decrease in angular velocity of the wheel is translated to the roller via the tread and the abutting contact between the bead and the rim.

Compounding the problem are the lateral forces to which the bead region is exposed as the vehicle bearing the tire is moved from side-to-side in cornering, frequently simultaneously with acceleration or, conversely, deceleration or braking.

Historically and traditionally, bead members have been formed of metal wire which is combined with rubber in an extruding operation, followed by a forming of the bead ring with an appropriate number of winds of the metal wire and a wrapping of the assembly with a friction-coated textile wrap.

To be considered with the foregoing is the fact that a wide variety of materials have been employed in the formation of the various reinforcement cords for the carcass and other auxiliary reinforcement members disposed within the tire. These reinforcement members includes the plurality of bias inclined cord carcass plies as well as various breaker strips or belt plies; these latter being situated in the crown region of the tire, generally above the carcass and below the tread. Cotton was the first material used in forming these various interior reinforcements, followed by rayon which is still used, the polyamides such as nylon, the polyesters (one being marketed under the trade name "DACRON"), the polypropylenes, etc. Fairly recently, glass had been suggested and, in fact, employed in the manufacture of pneumatic tires. U.S. Pat. No. 3,311,152 assigned to the same assignee as the present application discloses several different structures and outlines the several very desirable properties of a single glass filament which prompt the use of glass as a tire reinforcement material, usually in the form of a plurality of assembled strands or yarns as to form a cord.

The early efforts at manufacturing tires employing glass as a reinforcement met with substantial failure. This failure is believed due in part to the failure to recognize that glass, while possessing certain very desirable properties, also possessed a number of properties which are considerably different from those possessed by the conventionally employed organic textiles. These properties include stiffness, specific gravity, toughness and breaking elongation, With respect to these properties, the numerical values which glass possesses represent an essentially entirely different order of magnitude as compared to the numerical values of the referred-to organic materials. Inasmuch as the actual numerical values for these considerably different properties can be obtained from any standard reference work, they will not be recited herein.

By reason of these different properties and the early failures, it is believed that the employment of glass in the form of strands, yarns or cords must proceed with the realization that one cannot simply substitute glass for a given organic. Rather, the properties of the glass must be carefully considered in a design of the tire and, in particular, the geometrics of placement of the glass within the tire. Thus, the proper spatial location of various plies, the nature of the makeup of the plies in terms of the amount of form of glass (cords, strands, yarns, filaments or combinations), the particular angles of disposition, etc., must be carefully evaluated in order that one may arrive at a tire capable of performance and at the same time compatible from an economic point of view. Additionally, of course, it is important that all of the foregoing be carefully balanced in design in order that the ultimate tire will reflect in performance very desirable properties which glass possesses. This is particularly true in the consideration of a glass element, such as a fiber, filament, strand, yarn, cord or the like, as a possible bead former. Thus, the properties of glass vary considerably from those of the steel wire most commonly used in the forming of bead members.

In the light of the above introductory remarks, it is a general object of the present invention to provide a tire which features glass in one form or another as a bead ring member; the glass elements being in particular orientation and disposition as to lend structural integrity in the bead region sufficient as to meet the forces and stresses generated under dynamic application.

It is a particular object of the present invention to provide a tire construction featuring a bead member composed of glass in the form of a cord disposed in side-by-side relationship with similar cords and, in aggregate, defining a spirally wound structure.

It is a further object of the present invention to provide a tire construction featuring a bead member inclusive of glass in the form of cords and so disposed as to define a variable concentration of the glass filaments in various parts of the bead as viewed in cross section.

It is still another object of the present invention to provide a pneumatic tire construction inclusive of a bead structure composed of glass in several different forms; namely, essentially continuous length and discontinuous.

It is yet another object of the present invention to provide a tire construction inclusive of a bead containing glass in one form or another and, in addition, particular auxiliary reinforcement members or regions disposed as to augment or to provide reinforcement in the bead turnup regions of the tire.

The foregoing, as well as other objects of the present invention, will become apparent to those skilled in the art from the following detailed description taken in conjunction with the annexed sheets of drawings on which there are illustrated tire constructions and bead structures representing several variant embodiments of the present invention.

IN THE DRAWINGS

Figure 1:
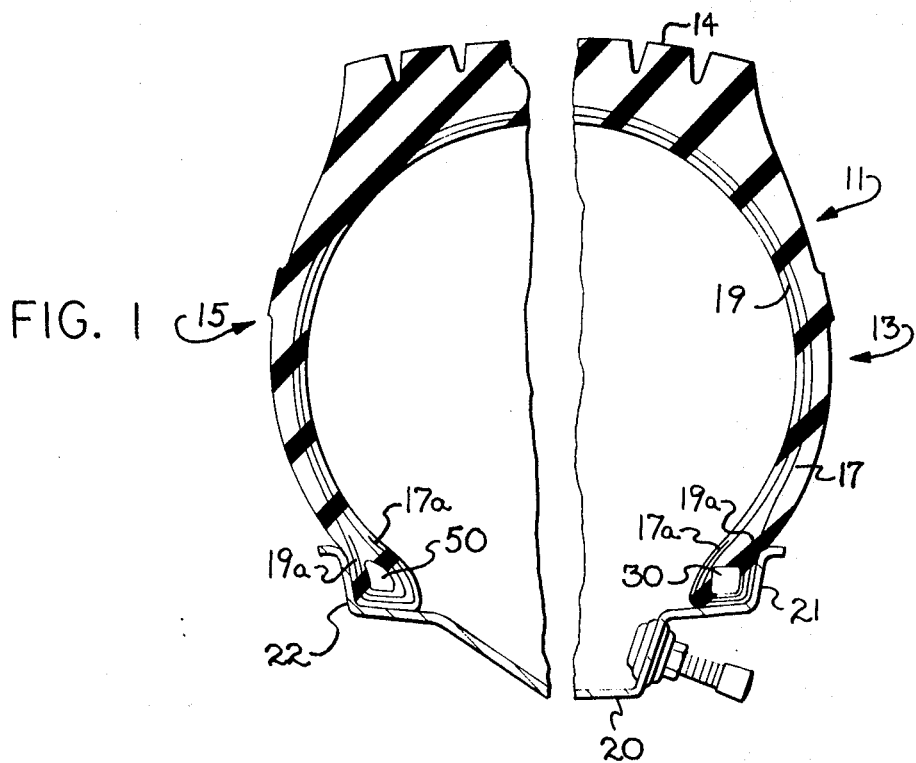
FIG. 1 is a sectional view of a tire broken into two similar halves in order to show two variant embodiments of tire constructions of the present invention.
Figure 2:
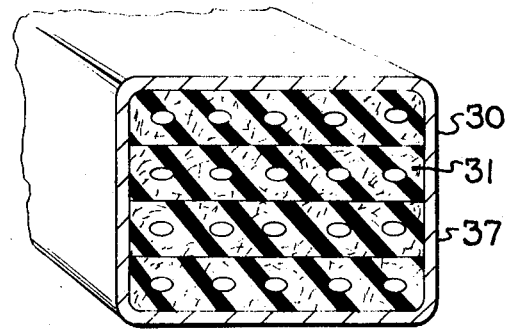
FIG. 2 is a perspective sectional view of a bead structure in accordance with one embodiment of the present invention.
Figure 3:
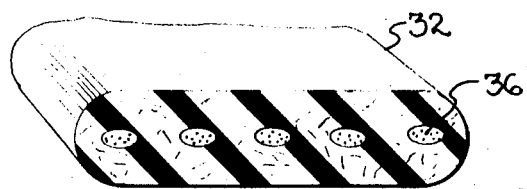
FIG. 3 is a similar view, that is, a perspective sectional view, of an intermediate elastomeric member used in forming the bead structure of FIG. 2.
Figure 7:
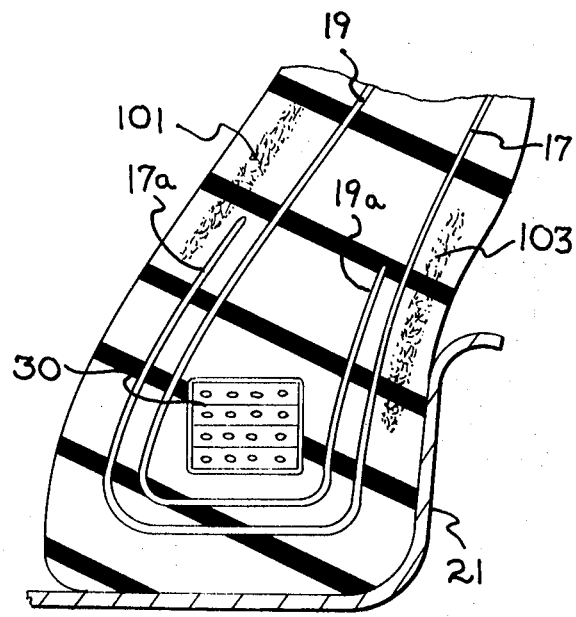
Figure 8:
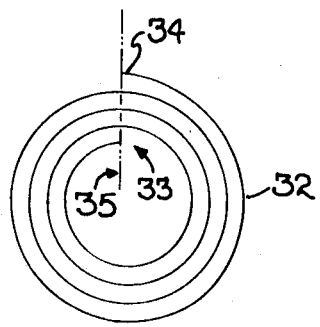

FIG. 7 is a sectional view greatly enlarged of the bead as illustrated in FIGS. 1-3 but inclusive of auxiliary reinforcement in accordance with a further embodiment of the present invention; and FIG. 8 is a schematic side elevation view illustrating the convolutions or the spiral disposition (shown in single line) of a bead and further illustrating the wind of the elongate band used in forming a bead in accordance with a preferred embodiment of the present invention.

Referring first to FIG. 1, there is disclosed a tire 11 which is shown in section but with a central region removed whereby the tire is composed of a right-hand portion 13 and a left-hand portion 15; the two segments being similar excepting in the construction of the head ring. The tire includes a tread 14, carried ky the toroidal body and disposed within the body, an outer carcass ply 17 and an inner carcass ply 19 having respective turnups about the bead 30; the turnups being identified ky the reference numerals 17a and 19a, respectively. The tire is mounted on a rim 20 having a right-hand flange region 21 for abutment with bead 30 and a left-hand flange region 22 for abutment with bead 50.

The bead 30 in the right-hand segment 13 of the tire 11 is shown greatly enlarged in FIG. 2. The bead is composed of four layers 31. These layer are formed of a single elongate band wound upon itself to define a spiral. This configuration is shown schematically and in side elevation in FIG. 8 wherein the length is defined by the reference numeral 32. The opposed ends of the length identified respectively by the reference numerals 33 and 34 are not overlapped but rather are radially aligned as designated by the dotted line 35. The elongate band 32 is shown in enlarged section in FIG. 3. The band is formed of any particular rubber such as natural, the butadiene styrenes, etc., used in the manufacture of tires. Embedded within the band are a plurality of reinforcement cords 36 disposed in generally spaced parallel relationship. The reinforcement cords in accordance with the present invention are formed of a plurality of strands and/or yarns, each in turn formed of a multiplicity of continuous glass filaments. These cords and, as well, the individual filaments are desirably first treated in a manner to be described in order to adapt them for ready compatibility with the elastomeric matrix. Also embedded within the elastomeric matrix of which the band is composed are a plurality of discrete lengths of glass in the form of filaments, strands, yarns, cords and/or mixtures thereof.

Generally speaking, by the term "strands" is meant a collection or plurality of individual fibers or filaments as gathered together following attenuation of the filaments from the platinum "forming" bushing. The number of filaments in a strand may vary from several hundred up to several thousand. The term "yarns" designates an assembled plurality of strands, usually numbering from 2 to 10 or more. The term "cords," in turn, designates a structure inclusive of an assembled plurality of yarns, usually from two to five or more. The reference numeral 37 identifies a skim-coated fabric wrap for the bead which need not be described in detail since it is conventional in the art of tire manufacture.

Figure 4:
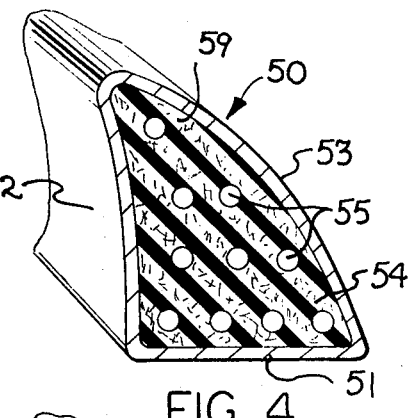
FIG. 4 is similarly a sectional perspective view of a bead former in accordance with an auxiliary embodiment of the present invention.

Referring to FIG. 4, there is shown greatly enlarged bead 50 of the left-hand segment 15 of the tire 11 of FIG. 1. The bead 50 includes an inner annular surface 51, a connecting radially extending surface 52 which is generally substantially perpendicular to the surface 51 and, connecting the surfaces 51 and 52, an inclined surface 53. In section, the bead approximates a right triangle with the surface 53 constituting the hypotenuse thereof. Embedded interiorly of the elastomeric matrix 54 are a plurality of reinforcement cords 55 which are desirably formed of glass elements, the same as the cords 36. The cords 55, like the cords 36, are composed of a plurality of yarns and/or strands, each composed of a multiplicity of individual continuous glass filaments. As illustrated generally schematically in FIG. 4, the concentration of cords is greatest in that region of the bead proximate the inner annular surface 51 and this concentration decreases generally uniformly in the region of the bead extending away from the inner annular surface 51. To illustrate this feature schematically, there are illustrated four cords in generally spaced relationship proximate the annular surface 51. Outwardly therefrom, there is an array of three cords in side-by-side relationship and outwardly from the three cords is an array of two cords in side-by-side relationship. Finally, in the outermost extent of the bead, there is a single cord. The cross-sectional contour of the bead 50 is thus generally and essentially congruent with respect to the cross-sectional contour of the exterior surfaces of the bead region of the tire. This can be seen most clearly in the left-hand portion of FIG. 1.

Figures 5, 6:
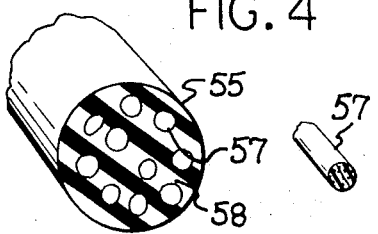
FIG. 5 is a perspective sectional view of a member used in forming the bead member shown in FIG. 4.
FIG. 6 is likewise a perspective plan sectional view but of a component of the member illustrated in FIG. 5.

In FIG. 5, there is shown in cross section the cord 55 which is composed of a plurality of strands or yarns 57 embedded in an elastomeric matrix 58. A single yarn 57 is illustrated in FIG. 6; the dots therein representing individual filaments of glass, numbering from several hundred to several thousand. In accordance with a preferred embodiment of the present invention, the elastomeric matrix 54 (see FIG. 4) has embedded therein a plurality of discrete lengths of glass in the form of filaments, strands, yarns, cords and/or the like, including mixtures thereof. These lengths are identified by the reference numeral 59 in FIG. 4.

Reference may now be had to FIG. 7 wherein there is disclosed a bead structure including a modification which represents an additional embodiment of the present invention. For purposes of illustration, a bead structure 30 as illustrated in the right-hand segment of the tire 11 in FIG. 1 is employed. Accordingly, the same reference numerals as in FIG. 1 will be utilized for common parts and excepting that the features representing the modified structure will be identified by reference numerals of three digits. As can be seen, the bead is shown in abutting contact with a rim 21. The carcass plies 17 and 19 extend downwardly from the sidewall region and are respectively turned reversely upwardly about the bead member; the turnup ends being identified respectively by tee reference numerals 17a and 19a. This bead turnup region, which lies more or less between the actual bead ring member and the sidewall member, represents a region of particular stress, particularly in the case of tires featuring reinforcement with glass-cord carcass plies. Further, the problem exists both in the case of radially disposed cords and bias cords. Failure or separation and deterioration in this region also occurs in the case of tires composed of organic cord carcass plies and, additionally, including glass cord belts in the crown region of the tire. Aspect ratios in the lower range of 0.8 or below also appear to increase the tendency for difficulty to be experienced in this region. It is suspected that with the low aspect ratio the path of the cords of the carcass ply in passing through this region, that is, from the sidewall down to and up about the bead ring member, is more acute. While it is not known with certainty, it is also believed that the nature of the glass cord in terms of stiffness has a tendency to reflect itself in difficulty in this region of the tire.

In accordance with the present invention and to meet this particular difficulty, the tire is provided with auxiliary reinforcement. In FIG. 7, two such auxiliary reinforcement members are shown. One is identified by the reference numeral 101 and is located adjacent the carcass turnup 17a and extending up into the curved portion of the sidewall. The other auxiliary reinforcement identified by the reference numeral 103 is located generally proximate the carcass turnup terminus 19a and similarly extends partially up into the sidewall region. The auxiliary reinforcement members 101 and 103 are composed of an elastomer or rubber compatible with the rubber material of which the tire is composed but has distributed therethrough lengths of glass in the form of filaments, strands, yarns, cords and the like, including mixtures thereof. Under certain circumstances, the lengths may be randomly distributed therethrough, while in certain cases a particular substantial orientation may be in order. The auxiliary reinforcement members, e.g., 101 and/or 103, are introduced into the tire during the tire-building operation. Thus, it is readily appreciated that strips of vulcanizable elastomeric stock containing the chopped lengths can be applied onto the tire-building drum in appropriate sequence and in the proper location as will provide for the finished tire to have the general composition as illustrated in FIG. 7, particularly as to the thickness and location of the auxiliary reinforcement material. The unvulcanized reinforcement members containing the lengths of glass can be readily produced by introducing the glass into a mill mix of the particular elastomeric stock. As indicated previously, the stock may be natural rubber, a butadiene styrene rubber, a mixture thereof or the newer stereo specific rubbers such as polybutadiene, polyisoprene or other polyolefin polymer. The glass is generally introduced as chopped lengths of filaments, strands, yarns or cords ranging generally from one-quarter inch to several inches in length. As the glass lengths are worked into the stock on the mill, some size degradation and, as well, separation of the glass strands, yarns or cords into individual filaments occurs. A particular advantage occurring through the use of the auxiliary reinforcement members, and particularly as containing chopped lengths of glass, resides in the fact that the ultimate rubber in the vulcanized state is possessed of a higher modulus than the elastomeric stock possesses alone. Additionally, the rubber stock suffers no degradation in elasticity or "nerve" inasmuch as there is no chemical or physical reaction which involves the rubber polymers or additive materials. With organic yarns, there is frequently a chemical or physical reaction which results in the formation of a deader stock.

As referred to earlier herein, the glass should be treated before incorporation into the elastomeric matrix. In the first place, it will be appreciated that filaments of glass are drawn in a molten state from a heated multiorifice platinum bushing. As the filaments, which may number from 204 up to several thousand, are attenuated, they become cooler and solidify. Simultaneously, the filaments are gathered together and wound about a rotating spool. As the filaments are drawn together, they are sprayed conveniently with a size composition preferably containing an anchoring agent adapted to impart to the glass surface the ability to adhere to the ultimate rubber stock. A suitable size is an amino silane. A variety of silane sizes, and particularly of the amino variety, are disclosed in application Ser. No. 406,501, now Pat. No. 3,391,052 filed Oct. 26, 1964, entitled "Glass Fibers Treated For Combination With Elastomeric Materials And Method" and being assigned to the assignee of the present application. One typical size composition is composed of 0.5–2.0 percent by weight of gamma-aminopropyltriethoxy silane, 0.3–0.6 percent by weight of a lubricant, such as glycerine, and the remainder composed of water.

An assembly of filaments wound upon the spool as described is identified as a strand. Similar strands can be combined with or without twist to form yarns which in turn can be plied and combined with like yarns with or without twist to form the cords or bundles. The yarns, strands and/or cords or bundles composed of a plurality of strands and/or yarns are desirably additionally treated by an impregnation thereof with an elastomeric impregnant to assist in the attachment or securement thereof to the surrounding rubber matrix in the tire construction. Impregnation may be accomplished by simply immersing the traveling yarn, or cord, or a plurality thereof in array, into a suitable impregnant bath, for example, 60–40 parts by weight of a 38 percent dispersed solids system including a butadiene-styrene-vinyl pyridine terpolymer latex, a butadiene styrene latex and a resorcinol-formaldehyde resin; said solids being dispersed in 40 parts by weight of water. A suitable commercial product is "LOTOL 5440," a product marketed under that trade name by Uniroyal (formerly U.S. Rubber Company).

The impregnated cords are then dried by passing through an oven controlled at a temperature of 400°–700° F. to dry the impregnant, thereby decreasing its tackiness and utility for further processing and at the same time achieving a partial vulcanization of the elastomeric component of the impregnant. The impregnated cord can then be used either as a continuous length and combined with the elastomeric matrix to form one of the bead formers as described earlier herein. Extrusion, calendering and a drum winding operation can be employed to embed the continuous strands, yarns or cords in an elastomeric matrix of appropriate configuration. The extrusion of rubber onto a continuous length of a substrate is a well-known art and therefore need not be described in detail herein. Furthermore, calendering is an industrial rubber operation which is well-known and need not be described in detail herein.

Tire manufacture itself is a well-established operation and the building of a tire including bead setting, drum setting, etc., need not be gone into in detail.

The bead structures described herein are most desirably incorporated into tires featuring all glass reinforcement; that is, in the carcass cords and in the belts or breaker strips as belt or breaker strip cords; since the bead regions of all glass reinforced tires are particularly sensitive to the development of defects due to stresses and forces concentrated in this region.

An extension of the present invention contemplates the employment of a gum strip extending from the bead turnup region (for example, proximate the auxiliary reinforcement member 101 or 103) upwardly into the shoulder region just beneath the lateral edges of belt ply reinforcing members. These are not shown in the drawings but are well-known in the art as extending about the tire beneath the tread in order to provide stability and resist penetration by objects encountered by the tire in its rolling contact with the ground. The gum strip thus provides or serves a dual function; auxiliary reinforcement in the bead turnup region and, additionally, provides for a desirable positioning of the breaker strip or belt ply so that its lateral edges are raised whereby the contour of the breaker strip or belt ply more closely approximates the curvature of the ground-contacting tread surface.

Modifications may be resorted to without departing from the spirit and scope of the present invention.

We claim:

1. In a tire construction including spaced bead members, a connecting carcass extending toroidally from bead to bead and a ground-engaging tread carried at the crown of said carcass; the improvement wherein said bead members each comprise a spiral wound band of elastomeric material, said spiral wound band defining a generally circular hoop, said band including a plurality of cords in side-by-side spaced relation and extending generally from lateral edge to lateral edge of said band, said cords comprising essentially a plurality of subelements composed of a plurality of glass filaments, and said elastomeric material in said band containing distributed therethrough a plurality of discrete lengths of glass in the from of filaments, strands, yarns, cords and the like, including mixtures thereof.

2. A tire construction as claimed in claim 1, wherein said carcass includes two plies which have their terminal edges turned up about said beads and said tire includes a region proximate said terminal edge turnup, said region including a plurality of lengths of glass in the form of filaments, strands, yarns, cords and the like, including mixtures thereof, said region lying between the terminal edge and an adjacent exterior surface of said tire.

3. A tire construction as claimed in claim 2, wherein there are two of said regions, one proximate each of said terminal edges.

4. In a pneumatic tire comprising spaced ringlike beads adapted for engagement with rim portions of a vehicle wheel, a carcass extending connectingly toroidally from one bead to the other and a ground-engaging tread carried on the crown of said carcass; the improvement wherein said beads are each defined by inner and outer surfaces connecting respectively with the inner and outer sidewall surfaces and said inner and outer surfaces of said bead are connected by an annular surface which is concentric with the rotational axis of said tire, said beads each including a plurality of winds of a cord material, the number of winds being such that the concentration of cords is greatest in that region of the bead contiguous to said annular surface and the concentration of cords is uniformly less and less in a direction away from said annular surface, said beads in cross section defining thereby generally a triangle, the hypotenuse of which is generally parallel to the inner surface of said bead, said bead cord consisting essentially of a large multiplicity of glass filaments and said bead otherwise comprising an elastomeric material surrounding said cords, said elastomeric material containing randomly disposed therethrough lengths of glass in the form of filaments, strands, yarns, cords and the like, including mixtures thereof.

5. A tire construction as claimed in claim 4, wherein said filaments are encapsulated in an epoxy resin.